US010232872B2

(12) United States Patent
Asakura et al.

(10) Patent No.: US 10,232,872 B2
(45) Date of Patent: Mar. 19, 2019

(54) STEERING APPARATUS (71) Applicant: JTEKT CORPORATION, Osaka-shi, Osaka (JP)

(72) Inventors: Toshihiro Asakura, Chiryu (JP); Takuya Nakayama, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 91 days.

(21) Appl. No.: 15/667,756

(22) Filed: Aug. 3, 2017

(65) Prior Publication Data

US 2018/0043927 A1 Feb. 15, 2018

(30) Foreign Application Priority Data

Aug. 12, 2016 (JP) ................. 2016-158349

(51) Int. Cl.
| B62D 5/04 | (2006.01) |
| F16H 25/22 | (2006.01) |
| F16H 35/18 | (2006.01) |
| F16B 39/02 | (2006.01) |

(52) U.S. Cl.
CPC ......... B62D 5/0448 (2013.01); B62D 5/0424 (2013.01); F16H 25/2204 (2013.01); F16H 35/18 (2013.01); B62D 5/0403 (2013.01); F16B 39/025 (2013.01)

(58) Field of Classification Search
CPC .. B62D 5/0448; B62D 5/0424; B62D 5/0403; F16H 25/2204; F16H 35/18
See application file for complete search history.

(56) References Cited

U.S. PATENT DOCUMENTS

| 9,314,835 B2 | 4/2016 | Kitamura et al. | |
| 2014/0027196 A1 | 1/2014 | Kaneko et al. | |
| 2014/0034410 A1* | 2/2014 | Jackson ................... | B62D 5/04 180/444 |

(Continued)

FOREIGN PATENT DOCUMENTS

| JP | 4311122 B2 | 8/2009 |
| JP | 2014-024357 A | 2/2014 |
| WO | 2016/125368 A1 | 8/2016 |

OTHER PUBLICATIONS

Feb. 1, 2018 Extended European Search Report issued in Patent Application No. 17185748.5.

*Primary Examiner* — Kevin Hurley
*Assistant Examiner* — Marlon A Arce
(74) *Attorney, Agent, or Firm* — Oliff PLC (57) ABSTRACT There is provided a steering apparatus including a fixing mechanism for fixing a driven pulley and a rolling nut to each other, the fixing mechanism configured to suppress at least one of deformation of external teeth of the driven pulley and an increase in size of a housing surrounding the driven pulley. A steering apparatus includes: a steered shaft; a ball screw mechanism including a rolling screw portion, a rolling nut, and rolling elements; a motor; a belt transmission mechanism including a drive pulley, a driven pulley, and a toothed belt; and a fixing mechanism. The fixing mechanism includes an internal thread, a cutout section, and a locknut. The cutout section is provided at a position offset, in the axial direction, from a range of second external teeth in the axial direction, and the locknut includes a locknut body, a locking lug, and a remaining portion.

5 Claims, 10 Drawing Sheets (56) References Cited

U.S. PATENT DOCUMENTS

2015/0041241 A1* 2/2015 Yoshikawa ............... F16D 3/68
                                                        180/444
2016/0207560 A1* 7/2016 Muto ................... B62D 5/0403
2017/0008555 A1* 1/2017 Kitamura ............. B62D 5/0448
2017/0349205 A1   12/2017 Kaneko et al.

* cited by examiner

STEERING APPARATUS

INCORPORATION BY REFERENCE

The disclosure of Japanese Patent Application No. 2016-158349 filed on Aug. 12, 2016 including the specification, drawings and abstract is incorporated herein by reference in its entirety.

BACKGROUND OF THE INVENTION

1. Field of the Invention

The invention relates to a steering apparatus.

2. Description of Related Art

Japanese Patent Application Publication No. 2014-24357 (JP 2014-24357 A) describes an electric power steering apparatus in which a rotational driving force generated by an electric motor is converted into an axial thrust by a ball screw mechanism, whereby an operation of a rack shaft is assisted. In the steering apparatus, a motor shaft of the electric motor and the rack shaft are disposed parallel to each other at offset positions. A driven pulley configured to transmit a rotational driving force generated by the electric motor and a rolling nut of the ball screw mechanism are fixed to each other in an integrated manner.

An example of a fixing mechanism will be described below. An external thread provided on an outer peripheral surface of the rolling nut is screwed into an internal thread provided on an inner peripheral surface of the driven pulley, and then "squeezing" is performed on end portions of the external and internal threads. The external thread and the internal thread screwed together are deformed by squeezing, so that the rolling nut and the driven pulley are not allowed to rotate relative to each other.

Japanese Patent No. 4311122 describes a steering apparatus in which a motor shaft of an electric motor and a rack shaft are coaxially disposed. In the steering apparatus, the motor shaft and a locknut are fixed to each other in an integrated manner. In a fixing mechanism, first, the locknut having an outer peripheral surface on which an external thread is provided is screwed into a hollow motor shaft having an inner peripheral surface on which an internal thread is provided, and an end surface of the locknut presses and fixes the ball nut in the axial direction. After that, a thin wall position Provided at an end portion of the locknut is bent toward a recess provided in one end portion of the motor shaft, and the bent thin wall portion is engaged with the recess. As a result, the locknut and the motor shaft are prevented from rotating relative to each other.

In the steering apparatus described in JP 2014-24357 A, the fixing mechanism is provided through squeezing. In this case, external teeth on an outer periphery of the driven pulley, which are in the vicinity of a squeezed portion, may be deformed during squeezing. As a result, abnormal noise may occur during an operation of a toothed belt looped over the driven pulley and a drive pulley fixed to the motor shaft, or tooth jumping may occur, which decreases the transmission torque.

Even if the fixing mechanism described in Japanese Patent No. 4311122 is applied to the steering apparatus described in JP 2014-24357 A, it is necessary to carefully check whether deformation of the external teeth of the driven pulley has occurred.

In addition, if the fixing mechanism described in Japanese Patent No. 4311122 is applied to the steering apparatus described in JP 2014-24357 A, the size of the fixing mechanism for fixing the driven pulley and the rolling nut to each other may be larger, in the axial direction, than the fixing mechanism provided through squeezing. As a result, a housing surrounding the driven pulley is increased in size.

SUMMARY OF THE INVENTION

One object of the invention is to provide a steering apparatus including a fixing mechanism for fixing a driven pulley and a rolling nut to each other, the fixing mechanism configured to prevent at least one of deformation of external teeth of the driven pulley and an increase in size of a housing surrounding the driven pulley.

A steering apparatus according to a first aspect of the invention includes: a steered shaft supported by a housing so as to be slidable in an axial direction and configured to make a reciprocating motion in the axial direction to steer steered wheels; a ball screw mechanism including a rolling screw portion having a first screw groove provided on an outer peripheral surface of the steered shaft, a rolling nut having a second screw groove corresponding to the first screw groove and provided on an inner peripheral surface of the rolling nut, and a plurality of rolling elements accommodated between the first screw groove and the second screw groove; a motor fixed to the housing and provided with an output shaft that is offset from the steered shaft; a belt transmission mechanism including a drive pulley fixed to the output shaft so as to be rotatable together with the output shaft in an integrated manner and having first external teeth provided on an outer periphery of the drive pulley, a driven pulley provided outside the rolling nut and having second external teeth provided on an outer periphery of the driven pulley, and a toothed belt having internal teeth meshed with the first external teeth and the second external teeth and configured to transmit a driving force between the drive pulley and the driven pulley; and a fixing mechanism configured to restrict relative rotation between the rolling nut and the driven pulley.

The fixing mechanism includes: an internal thread provided on an inner peripheral surface of the driven pulley; a cutout section provided in the driven pulley, at a position closer to a first end side of the driven pulley than the internal thread, and configured to be open at least at a radially inner side of the driven pulley and an axially end side of the driven pulley in the axial direction, and a locknut including a locknut body having an external thread screwed into the internal thread, and a locking lug disposed in the cutout section and engaged with the driven pulley in a circumferential direction. The cutout section is provided at a position offset in the axial direction from a range of the second external teeth in the axial direction. The locknut includes: a locknut body; the locking lug that is a portion of a thin-wall cylindrical portion extending from the locknut body in the axial direction and thinner than the locknut body, the locking lug being formed to extend outward in a radial direction, and engaged with the cutout section in the circumferential direction, and a remaining portion that is a portion of the thin-wall cylindrical portion other than the locking lug.

In this way, the cutout section of the driven pulley is provided at a position offset, in the axial direction, from the range of the second external teeth in the axial direction. For this reason, when the locking lug and a portion of the driven pulley, which defines the cutout section, press each other in the circumferential direction to restrict the relative rotation, there is a low possibility that the second external teeth will be deformed due to a pressing force from the locking lug.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a view when FIG. 3 is seen from the right side;

FIG. 6C is a view when FIG. 6B is seen from below, FIG. 6C illustrating a third state of the locknut that is deformed during assembly of the fixing mechanism;

DETAILED DESCRIPTION OF EMBODIMENTS

Hereinafter, a steering apparatus according to a first embodiment of the invention will be described with reference to the accompanying drawings. As an example of the steering apparatus, an electric power steering apparatus for a vehicle will be described below. The electric power steering apparatus is a steering apparatus configured to assist a steering operation using a steering assist force generated by a motor M. Note that, examples of the steering apparatus include a four-wheel steering apparatus, a rear wheel steering apparatus, and a steer-by-wire apparatus, in addition to the electric power steering apparatus.

Configuration of Electric Power Steering Apparatus

Figure 1:
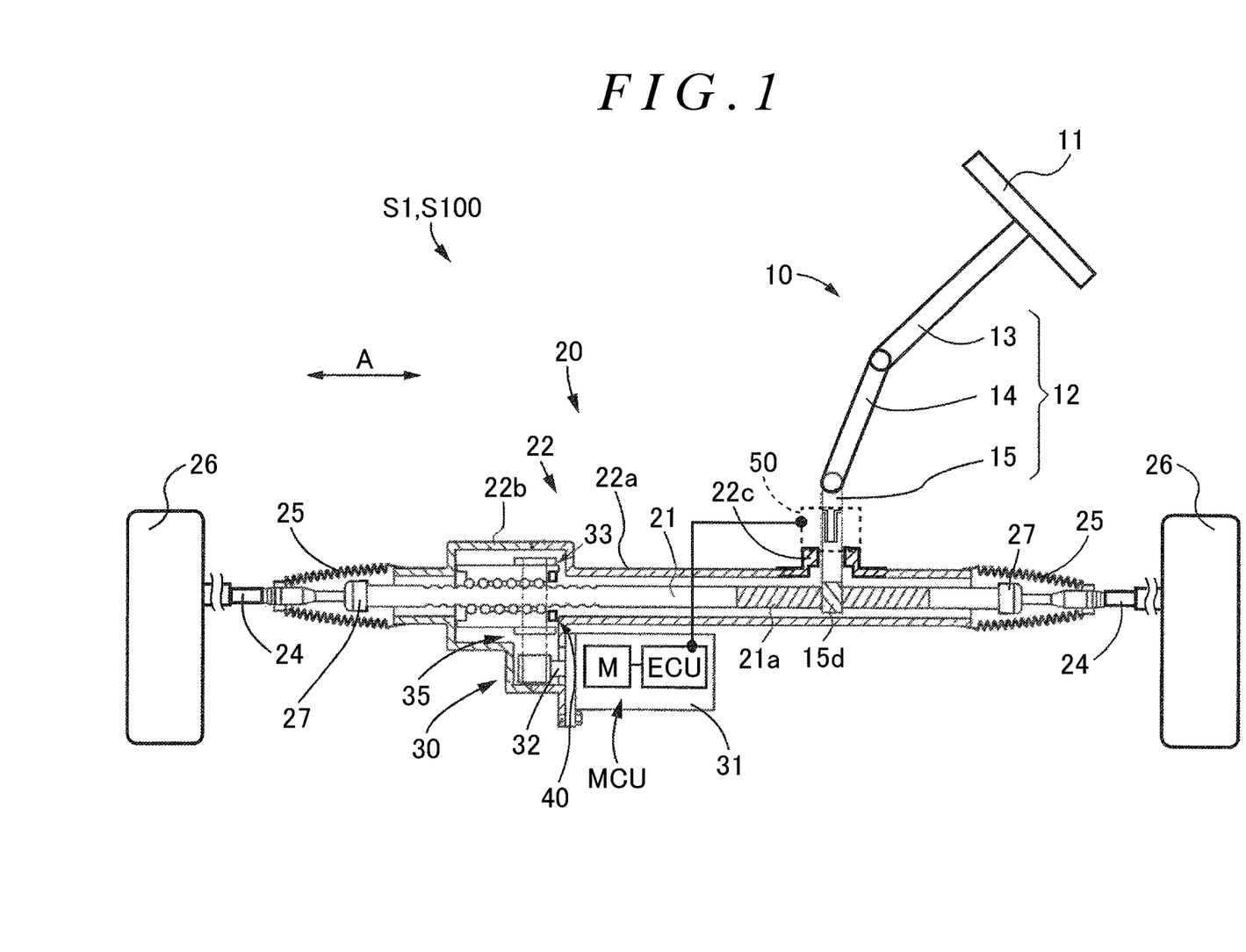
FIG. 1 is a view schematically illustrating an electric power steering apparatus according to the invention.

As illustrated in FIG. 1, an electric power steering apparatus S1 (hereinafter, simply referred to as "steering apparatus S1") includes a steering mechanism 10, a steering operation mechanism 20, a steering assist mechanism 30, a fixing mechanism 40 and a torque detection mechanism 50. The steering mechanism 10 includes a steering wheel 11 and a steering shaft 12. The steering wheel 11 is fixed to an end portion of the steering shaft 12. The steering shaft 12 transmits steering torque applied to the steering wheel 11 to steer steered wheels 26.

The steering shaft 12 is formed by connecting a column shaft 13, an intermediate shaft 14, and a pinion shaft 15 together. An output portion of the intermediate shaft 14 is connected to an input portion of the pinion shaft 15, and a pinion gear 15d is provided at an output portion of the pinion shaft 15.

The steering operation mechanism 20 includes a rack shaft 21 (an example of a steered shaft), and a housing 22 having a generally cylindrical shape. The rack shaft 21 makes a reciprocating motion in the axial direction in response to a steering angle of the steering wheel 11, thereby steering the steered wheels 26 of a vehicle. The rack shaft 21 is accommodated in the housing 22 and is supported so as to make a linear reciprocating motion (sliding motion) in the axial direction.

In the following description, the direction along the axial direction of the rack shaft 21 will be simply referred to "A-axis direction" (see FIG. 1). Further, in the following description, the right side in FIG. 1 will be referred to as "first end side", and the left side in FIG. 1 will be referred to as "second end side". The housing 22 includes a first housing 22a, and a second housing 22b fixed to a second end side portion (in FIG. 1, a left side portion) of the first housing 22a in the A-axis direction. The first housing 22a mainly accommodates the rack shaft 21. The second housing 22b mainly accommodates devices related to the steering assist mechanism 30.

A rack gear 21a is provided on an outer peripheral surface of the rack shaft 21. The rack gear 21a and the pinion gear 15d are meshed with each other to constitute a rack-and-pinion mechanism. The rack shaft 21 is provided with joints 27 at respective end portions thereof. Tie rods 24 are connected respectively to end portions of the joints 27. Distal ends of the tie rods 24 are connected to knuckles (not illustrated) to which the steered wheels 26 are assembled.

With this configuration, when the steering wheel 11 is steered, the steering torque is transmitted to the steering shaft 12 and the pinion shaft 15 is rotated. The rotation of the pinion shaft 15 is converted into a linear reciprocating motion of the rack shaft 21 by the pinion gear 15d and the rack gear 21a. As the motion in the A-axis direction is transmitted to the knuckles (not illustrated) via the tie rods 24, the steered wheels 26 are steered, and the traveling direction of the vehicle is changed.

One end portions of boots 25 are fixed to respective ends of the housing 22. The boots 25 have tubular bellows portions that are made of resin, expandable and contractible in the A-axis direction, and configured to cover joint portions between the joints 27 and the tie rods 24. The other end portions of the boots 25 are fixed to the tie rods 24.

The steering assist mechanism 30 is a mechanism configured to apply a steering assist force to the steering mechanism 10, using the motor M, which is controlled based on an output from the torque detection mechanism 50, as a driving source. The steering assist mechanism 30 includes a motor control unit (MCU), an output shaft 32, a ball screw mechanism 33, and a belt transmission mechanism 35. The steering assist mechanism 30 is accommodated in the second housing 22b and a third housing 31.

As illustrated in FIG. 1, in the steering assist mechanism 30, the MCU, in which a controller ECU and the motor M are integrated together, is disposed below the rack shaft 21 (below the rack shaft 21 in the direction of gravitational force). In this way, the steering apparatus S1 according to the present embodiment is configured as a so-called rack parallel-type electric steering apparatus, and is disposed in an engine compartment disposed at a front portion of the vehicle (outside a vehicle cabin).

Steering Assist Mechanism

Figure 2:
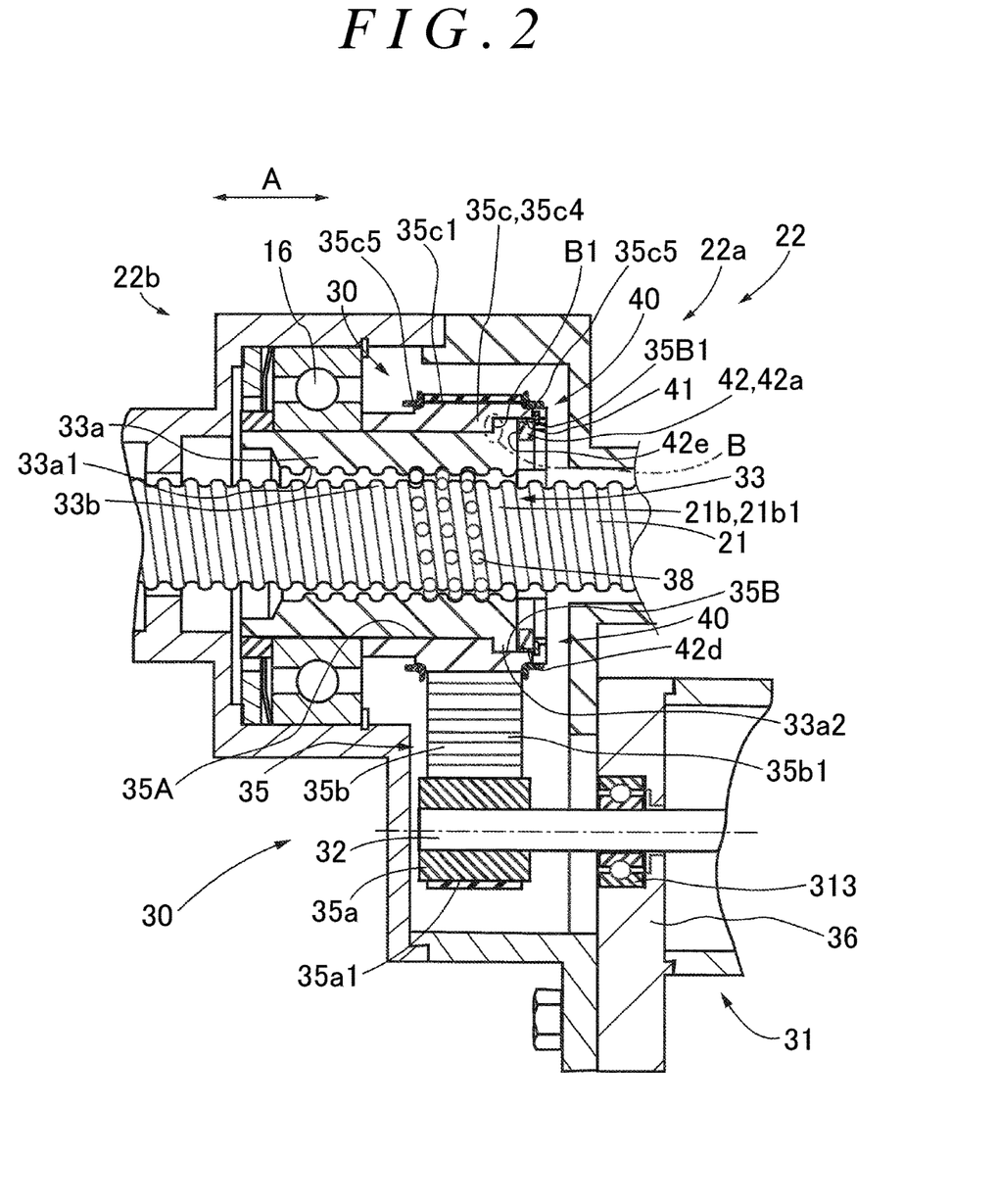
FIG. 2 is an enlarged sectional view of a steering assist mechanism and its surroundings in FIG. 1 according to an embodiment.

As illustrated in FIG. 2, the steering assist mechanism 30 transmits the rotary torque generated by the motor M to the ball screw mechanism 33 via the belt transmission mechanism 35. Then, the rotary torque is converted into a linear reciprocating moving force of the rack shaft 21 by the ball screw mechanism 33, and a steering assist force is applied to the steering mechanism 10.

The MCU including the motor M is accommodated in the third housing 31. The MCU is attached to the housing 22 so as to be apart from the rack shaft 21. Then, the output shaft 32 of the motor M is disposed to extend in the housing 22. At this time, as illustrated in FIG. 2, the axis of the output shaft 32 is set to be parallel to the axis of the rack shaft 21 (this configuration is an example of a configuration in which the output shaft 32 and the rack shaft 21 are offset from each other). The output shaft 32 is rotatably supported in a through-hole of a plate 36 via a bearing 313.

The belt transmission mechanism 35 includes a drive pulley 35a, a toothed belt 35b, and a driven pulley 35c. The belt transmission mechanism 35 is a mechanism configured to transmit a driving force (rotational driving force) generated by the motor M, between the drive pulley 35a and the driven pulley 35c via the toothed belt 35b.

As illustrated in FIG. 2, the drive pulley 35a is fixed to the output shaft 32 so as to be rotatable together with the output shaft 32 in an integrated manner, and first external teeth 35a1 are provided on the outer periphery of the drive pulley 35a. The toothed belt 35b is an annular rubber belt having a plurality of internal teeth 35b1 on the inner periphery thereof. The toothed belt 35b is looped over the outer periphery of the driven pulley 35c and the outer periphery of the drive pulley 35a in a state where the first external teeth 35a1 provided on the outer periphery of the drive pulley 35a and second external teeth 35c1 provided on the outer periphery of the driven pulley 35c are meshed with the internal teeth 35b1.

The toothed belt 35b is looped over the drive pulley 35a and the driven pulley 35c with a prescribed tension maintained, to prevent the situation where the driven pulley 35c and the drive pulley 35a are disengaged from each other and a tooth jumping occurs. The driven pulley 35c is a cylindrical member having a pulley body 35c4 and ribs 35c5.

As illustrated in FIG. 2, a first hole 35A and a second hole 35B are provided inside the driven pulley 35c (the pulley body 35c4) in the radial direction so as to be coaxial with an outer peripheral surface of the pulley body 35c4. The first hole 35A is provided in the second end side of the driven pulley 35c. The second hole 35B is provided in the first end side of the driven pulley 35c. The inner diameter of the first hole 35A is smaller than the inner diameter of the second hole 35B.

There is a level difference B at the boundary between the first hole 35A and the second hole 35B. A connecting surface B1 extending along the level difference B in the radial direction faces an opening 35B1 of the second hole 35B. In addition, an internal thread 41 is provided on an inner peripheral surface of a portion of the driven pulley 35c, which defines the second hole 35B.

As illustrated in FIG. 2, a rolling nut 33a is accommodated in a space in the first hole 35A. A flange portion 33a2 is provided at the first end side of the rolling nut 33a, and the flange portion 33a2 has a diameter larger than that of the other portion of the rolling nut 33a. A second-end-side end surface of the flange portion 33a2 is brought into contact with the connecting surface B1 extending along the level difference B.

The flange portion 33a2 and a locknut 42 having an annular shape (the fixing mechanism 40) are disposed in the space in the second hole 35B. An external thread 42d provided on the outer periphery of the locknut 42 is screwed into the internal thread 41 provided on the inner peripheral surface of the driven pulley 35c, which defines the second hole 35B.

In the present embodiment, the ribs 35c5 are annular members that are prepared separately from the pulley body 35c4. The ribs 35c5 are press-fitted and fixed to the respective sides of the second external teeth 35c1 of the driven pulley 35c (the pulley body 35c4).

Figure 3:
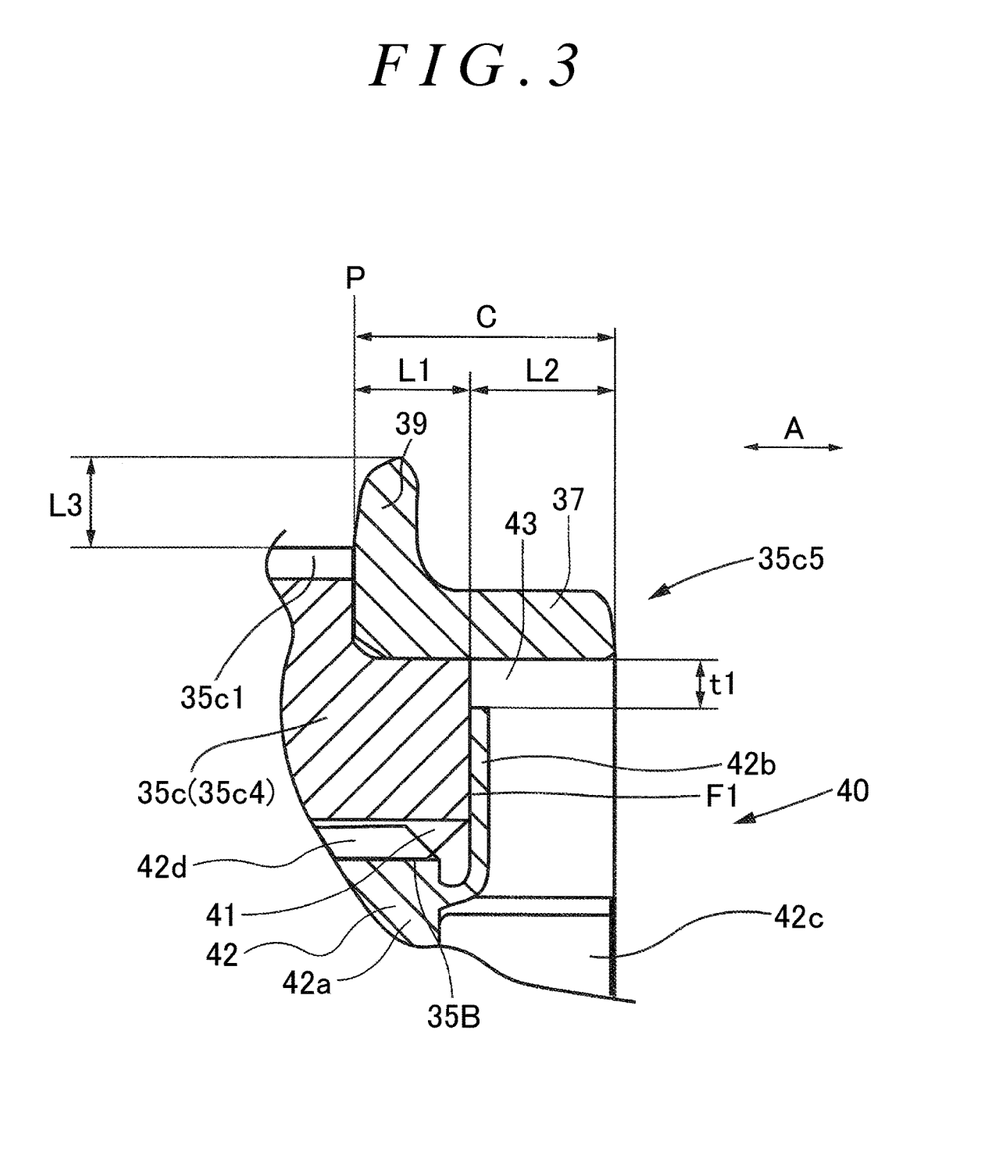
FIG. 3 is a partially enlarged view of FIG. 2.

Specifically, as illustrated in FIG. 3, each rib 35c5 has a cylindrical portion 37 having a cylindrical shape, and an annular portion 39 having an annular shape, provided at one axial end portion of the cylindrical portion 37, and extending radially outward from the cylindrical portion 37. That is, each rib 35c5 has an L-shaped section when the rib 35c5 is cut along a plane including the axis of the driven pulley 35c. One side of the L shape is the cylindrical portion 37, and the other side of the L shape is the annular portion 39. An inner peripheral surface of the cylindrical portion 37 is press-fitted to each of the outer peripheral surfaces of the driven pulley 35c, which are on the respective sides of the second external teeth 35c1.

When the ribs 35c5 are provided on the respective sides of the second external teeth 35c1 of the pulley body 35c4 in the axial direction, the annular portion 39 of each rib 35c5 protrudes radially outward from the second external teeth 35c1 by a length L3 (see FIG. 3). The length L3 is set to such a length that the toothed belt 35b is prevented from moving from the outer peripheral surface of the driven pulley 35c in the axial direction (the A-axis direction) and being detached from the driven pulley 35c when the motor M and the drive pulley 35a are rotated and thus the toothed belt 35b is operated. Further, the driven pulley 35c is fixed to the rolling nut 33a by the fixing mechanism 40 such that the driven pulley 35c and the rolling nut 33a are not allowed to rotate relative to each other.

With the foregoing configuration, the steering assist mechanism 30 drives the motor M in response to a rotational operation of the steering wheel 11, thereby rotating the output shaft 32 and the drive pulley 35a. The rotation of the drive pulley 35a is transmitted to the driven pulley 35c via the toothed belt 35b. As the driven pulley 35c is rotated, the rolling nut 33a fixed to the driven pulley 35c in an integrated manner is rotated. Then, as the rolling nut 33a is rotated, a steering assist force (power) in the axial direction of the rack shaft 21 is transmitted to the rack shaft 21 via the ball screw mechanism 33.

The torque detection mechanism 50 detects a distortion amount of a torsion bar (not illustrated) provided at an intermediate portion of the pinion shaft 15, and outputs a signal corresponding to the distortion amount to the controller ECU. The controller ECU sets a steering assist torque and controls an output of the motor M based on the output signal from the torque detection mechanism 50.

The ball screw mechanism 33 is a mechanism configured to apply a steering assist force to the steering mechanism 10 by converting the rotary torque generated by the motor M and transmitted via the belt transmission mechanism 35 into a linear reciprocating moving force of the rack shaft 21. As illustrated in FIG. 2, the ball screw mechanism 33 includes a ball screw portion 21b (an example of "rolling screw portion"), the rolling nut 33a, a connecting member (not illustrated), and a plurality of balls 38 (an example of "rolling elements").

The ball screw portion 21b is provided on the outer peripheral surface of the rack shaft 21 throughout a prescribed range in the A-axis direction. A first screw groove 21b1 is provided in the ball screw portion 21b. The first screw groove 21b1 is a spiral groove provided on the outer peripheral surface of the rack shaft 21 at a prescribed lead (pitch).

As described above, the rolling nut 33a is a cylindrical member disposed radially outward of the ball screw portion 21b and radially inward of the driven pulley 35c. As described above, the rolling nut 33a includes the flange portion 33a2 at an end portion on the first end side in FIG. 2. The second-end-side end surface of the flange portion 33a2 in FIG. 2 comes into contact with the connecting surface B1 extending along the level difference B. Thus, the rolling nut 33a is positioned with respect to the driven pulley 35c in the axial direction.

As described above, the rolling nut 33a is supported by the second housing 22b via a ball bearing 16 in a state where the position of the rolling nut 33a with respect to the driven pulley 35c is determined in the axial direction. In addition, at the first end side of the rolling nut 33a, the fixing mechanism 40 according to the invention (to be described later in detail) fixes the rolling nut 33a and the driven pulley 35c to each other such that the rolling nut 33a and the driven pulley 35c can rotate together in an integrated manner.

The rolling nut 33a has a second screw groove 33a1 on an inner peripheral surface thereof. The second screw groove 33a1 is a groove corresponding to the first screw groove 21b1 of the ball screw portion 21b. The second screw groove 33a1 is a spiral groove provided so as to face the first screw groove 21b1 of the ball screw portion 21b and having the same lead (pitch) as that of the first screw groove 21b1.

A spiral path (not illustrated) is formed of the first screw groove 21b1 and the second screw groove 33a1. Specifically, the spiral path in which the balls 38 (rolling elements) are accommodated is formed by a groove surface of the first screw groove 21b1, a groove surface of the second screw groove 33a1, and a space between the groove surfaces.

As the rolling nut 33a is rotated relative to the rack shaft 21, the balls 38 (rolling elements) roll along the spiral path. Then, the balls 38 that have rolled through the spiral path are guided to a passage in the rolling nut 33a by a connecting member (not illustrated), move through the passage in the rolling nut 33a, and are then returned to the spiral path by a connecting member (not illustrated). Because such a ball screw mechanism is a known technology, further detailed description will be omitted.

Configuration of Fixing Mechanism 40

Next, the configuration of the fixing mechanism 40 according to the invention will be described. As described above, the fixing mechanism 40 is a mechanism configured to fix the rolling nut 33a and the driven pulley 35c to each other at the first end side of the rolling nut 33a and the driven pulley 35c, such that the rolling nut 33a and the driven pulley 35c are allowed to rotate together in an integrated manner and relative rotation between the rolling nut 33a and the driven pulley 35c is restricted.

Figure 4:
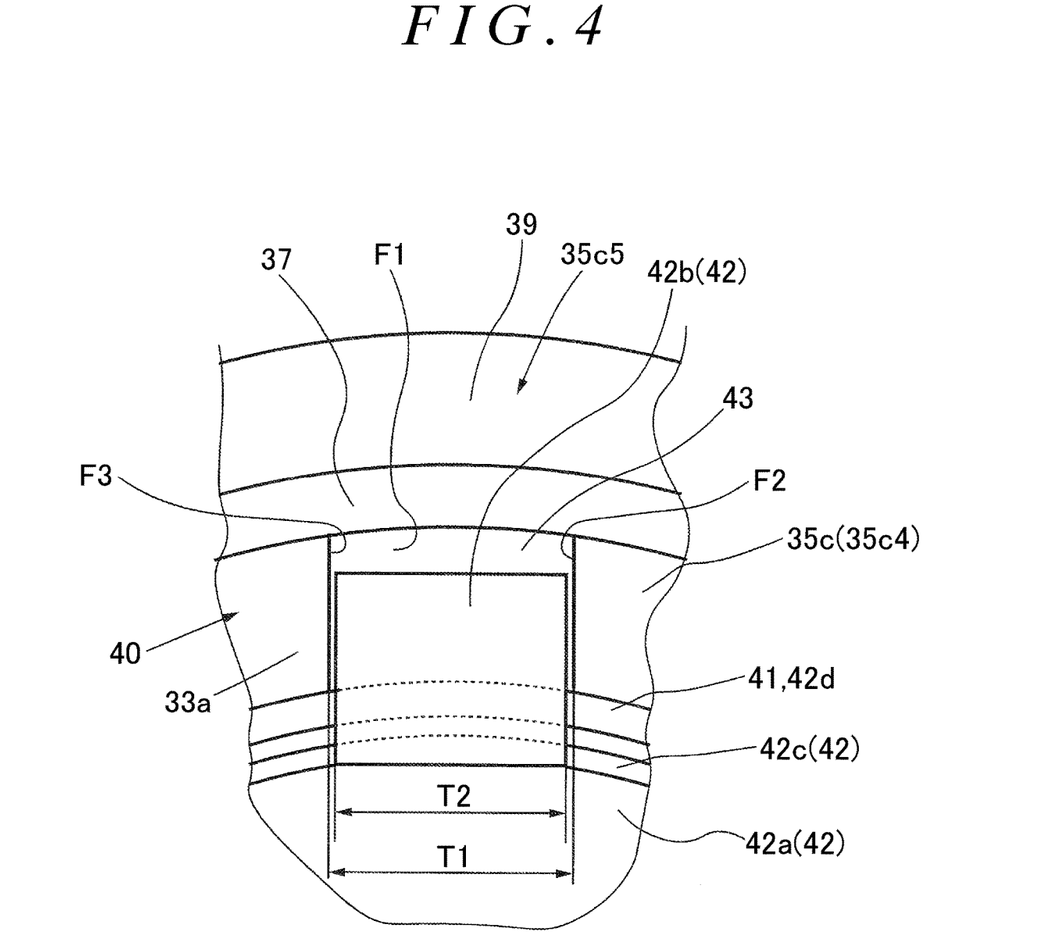
Figure 5:
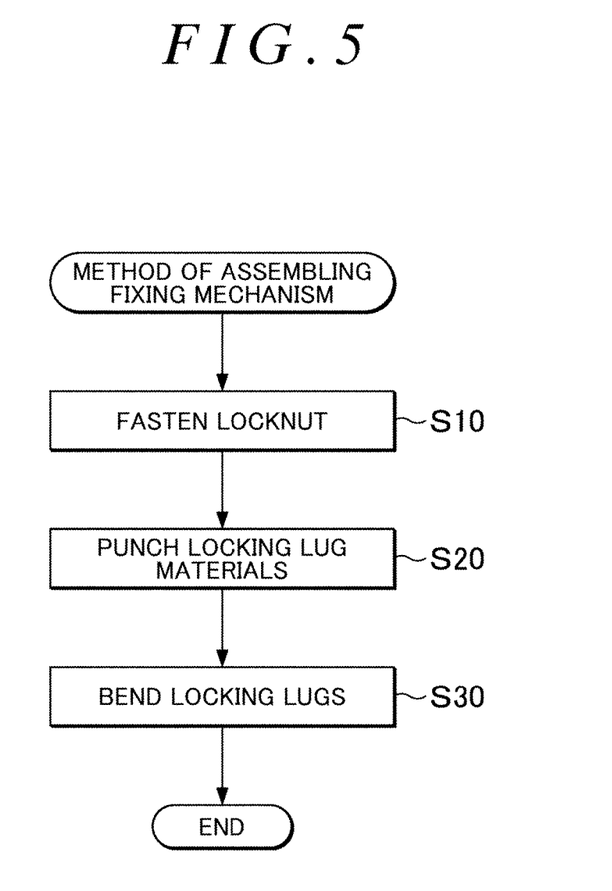
FIG. 5 is a flowchart of assembly of a fixing mechanism.

As illustrated in FIG. 4, the fixing mechanism 40 includes the internal thread 41 provided on the driven pulley 35c, the locknut 42, and cutout sections 43 provided in the driven pulley 35c. As described above, the internal thread 41 is provided on a portion of the inner peripheral surface, which defines the second hole 35B provided at the first end side of the driven pulley 35c.

As illustrated in FIG. 4, each cutout section 43 having a prescribed width T1 in the circumferential direction is provided so as to pass through an end portion of the pulley body 35c4 in the radial direction, at the first end side (the right side in FIG. 3) of the driven pulley 35c, that is, the first end side of the pulley body 35c4. That is, in the present embodiment, each cutout section 43 is a space that is open at three sides, that is, the radially inner side, the axially end side, and the radially outer side of the driven pulley 35c (the pulley body 35c4). Thus, the cutout section 43 contacts a bottom surface F1 and side surfaces F2, F3 of the pulley body 35c4. The bottom surface F1 and the side surfaces F2, F3 surround the cutout section 43, and the side surfaces F2, F3 face each other (see FIG. 3 and FIG. 4).

In the present embodiment, the cutout sections 43 are provided in the end portion of the pulley body 35c4, at two prescribed positions having rotation phases that are different by 180 degrees from each other in the circumferential direction. The cutout sections 43 provided at two positions have the same shape. Therefore, the following description of the cutout sections 43 will be provided on any one of the cutout sections 43.

Note that, the number of the cutout sections 43 is not limited to two. In the end portion of the pulley body 35c4, the cutout section 43 may be provided at only one position or the cutout sections 43 may be provided at three or more positions in the circumferential direction. When the cutout sections 43 are provided at three or more positions, preferably, the cutout sections 43 are provided at equal angular intervals (equal phases) in the circumferential direction.

As illustrated in FIG. 3, the cutout section 43 is provided at a position in the axial direction, which is outside a range of the second external teeth 35c1 in the axial direction (a range of the second external teeth 35c1 in the A-axis direction). That is, in FIG. 3, the cutout section 43 is provided so as to be offset rightward from a position P that is an end of the range of the second external teeth 35c1 in the axial direction.

In addition, the cutout section 43 is provided radially inward of the rib 35c5, within a range C of the rib 35c5 in the A-axis direction (see FIG. 3 and FIG. 4). The rib 35c5 described above closes the radially-outside opening of the cutout section 43.

In the present embodiment, a press-fitted length L1 of a press-fitted area in the axial direction, in which the pulley body 35c4 is press-fitted to the inner periphery of the cylindrical portion 37 of the rib 35c5 is about half of the entire length of the cylindrical portion 37 in the axial direction. However, the press-fitted length L1 may be set as appropriate. Thus, the remaining portion of the cylindrical portion 37 having a length L2 closes the radially-outside opening of the cutout section 43, and is press-fitted and fixed to the remaining outer peripheral surface of the pulley body 35c4, in which the cutout sections 43 are not provided.

Figure 6A:
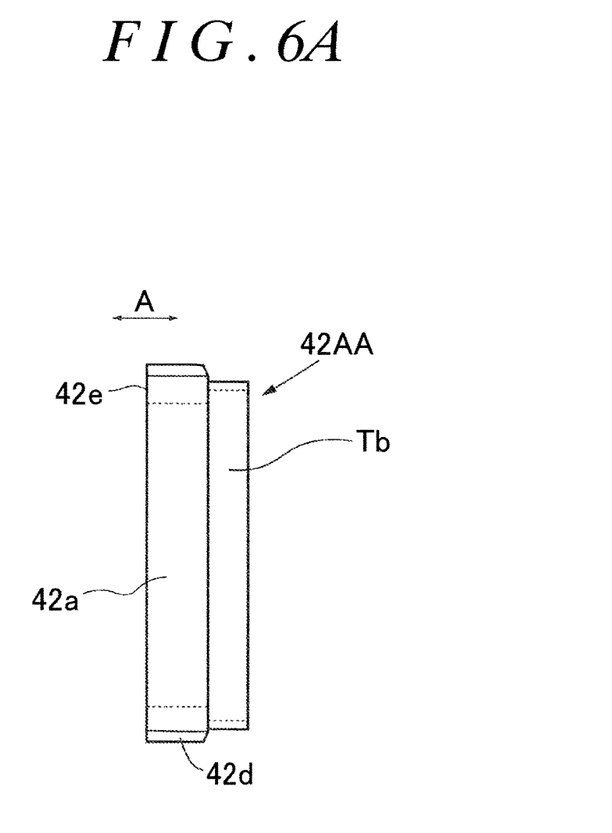
FIG. 6A is a view illustrating a first state of a locknut that is deformed during assembly of the fixing mechanism.

The locknut 42 is a member formed by deforming a part of a locknut material 42AA illustrated in FIG. 6A when the fixing mechanism 40 is provided. The locknut material 42AA has a locknut body 42a and a thin-wall cylindrical portion Tb.

The locknut body 42a has the external thread 42d provided on the outer peripheral surface thereof and screwed into the internal thread 41 of the driven pulley 35c. The locknut body 42a has a cylindrical shape extending in the A-axis direction. The thin-wall cylindrical portion Tb has a cylindrical shape extending in the A-axis direction from the first end side of the locknut body 42a having a cylindrical shape. The thin-wall cylindrical portion Tb and the locknut body 42a are coaxial with each other.

The thin-wall cylindrical portion Tb is thinner than the locknut body 42a. The thickness (wall thickness) of the thin-wall cylindrical portion Tb is, for example, about 0.5 mm. However, the thickness (wall thickness) of the thin-wall cylindrical portion Tb is just an example, and is not limited to about 0.5 mm. The rack shaft 21 is inserted through a space in a cylindrical portion of the locknut material 42AA.

The locknut 42 formed from the locknut material 42AA has the locknut body 42a, locking lugs 42b, and remaining portions 42c. The locking lugs 42b and the remaining portions 42c are formed from the thin-wall cylindrical portion Tb. The locking lugs 42b, which are part of the thin-wall cylindrical portion Tb, extend radially outward from the remaining portions 42c of the thin-wall cylindrical portion Tb.

Each locking lug 42b is engaged in a corresponding one of the cutout sections 43 positioned radially outward of the locking lug 42b (see FIG. 3 and FIG. 4). In this case, a radially-outside distal end of the locking lug 42b is at such a position that a clearance t1 is provided between the radially-outside distal end of the locking lug 42b and the inner peripheral surface of the cylindrical portion 37 of the rib 35c5, which closes the radially-outside opening of the cutout section 43. Thus, during formation of the locking lug 42b, the distal end of the locking lug 42b does not come into contact with the cylindrical portion 37 and does not press the driven pulley 35c to which the cylindrical portion 37 (the rib 35c5) is fixed. Thus, the second external teeth 35c1 are not deformed. Further, the locking lug 42b itself is not deformed.

In this case, preferably, a width T2 of the locking lug 42b in the circumferential direction is slightly smaller than the width T1 of the cutout section 43 in the circumferential direction. Thus, when the locking lug 42b is inserted into the cutout section 43, the locking lug 42b is engaged with the cutout section 43 with almost no clearance left in the circumferential direction. That is, relative movement in the circumferential direction between the locknut 42 having the locking lugs 42b and the driven pulley 35c having the cutout sections 43 is appropriately restricted. For this reason, it is possible to reliably prevent loosening of the locknut 42 due to rotation of the locknut 42 relative to the driven pulley 35c. In addition, in the present embodiment, a first-end-side end surface of each remaining portion 42c of the locknut 42 is configured not to protrude rightward in FIG. 3 from a first-end-side end surface of the driven pulley 35c.

Method of Assembling Fixing Mechanism 40

Next, a method of assembling the fixing mechanism 40 will be described mainly with reference to a flowchart in FIG. 5 and FIG. 6A to FIG. 6C. The method of assembling the fixing mechanism 40 includes a first step S10, a second step S20, and a third step S30.

In the first step S10 (a screwing step, see FIG. 5), the rolling nut 33a is inserted toward the second end side of the first hole 35A until a second-end-side end surface of the flange portion 33a2 of the rolling nut 33a comes into contact with the connecting surface B1, as illustrated in FIG. 2. After that, the external thread 42d provided on the outer periphery of the locknut material 42AA in the state illustrated in FIG. 6A and the internal thread 41 provided on the inner peripheral surface of the driven pulley 35c, which defines the second hole 35B, are screwed together, whereby the locknut material 42AA is fitted into the second hole 35B. Thus, an end surface 42e of the locknut material 42AA, which is on the rolling nut 33a-side, comes into contact with the end surface of the rolling nut 33a. Thus, the rolling nut 33a is fixed to the driven pulley 35c (the pulley body 35c4) in a pressed state where the rolling nut 33a is pressed toward the second end side.

Figure 6B:
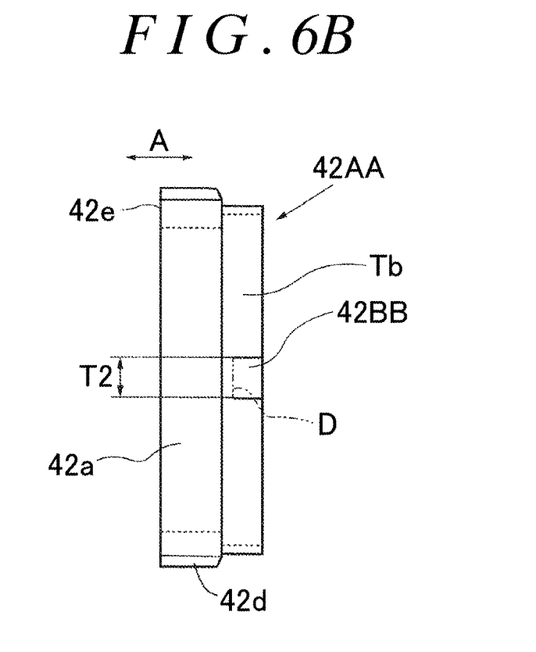
FIG. 6B is a view illustrating a second state of the locknut that is deformed during assembly of the fixing mechanism.

In the second step S20 (a punching step, see FIG. 5), locking lug materials 42BB for the locking lugs 42b are formed in a state where the locknut material 42AA is fitted in the driven pulley 35c (see FIG. 6B). That is, portions of an outer peripheral surface of the thin-wall cylindrical portion Tb of the locknut material 42AA, which face the cutout sections 43 of the driven pulley 35c after the first step S10, are punched toward the cutout section 43 by a punching die (not illustrated) with bent portions D left. Thus, the locking lug materials 42BB are formed. In this case, the width of each locking lug material 42BB in the circumferential direction is T2.

Figure 6C:
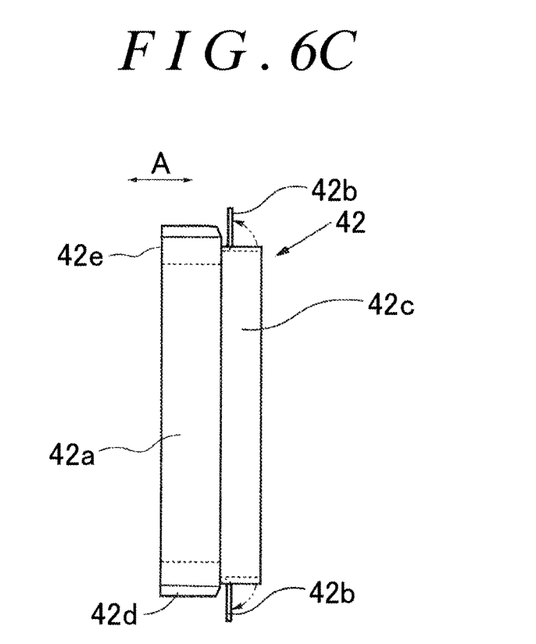

In the third step S30 (a bending process, see FIG. 5), each locking lug material 42BB is bent by about 90 degrees with respect to an axis using the bent section D as a support point, while being engaged with the cutout section 43 having a width of T1 (T1≥T2) in the circumferential direction. Thus, the locking lugs 42b are formed and the locknut 42 is formed, whereby assembly of the fixing mechanism 40 is completed (a state illustrated in FIG. 6C is achieved). For this reason, it is possible to reliably prevent loosening of the locknut 42 due to rotation of the locknut 42 relative to the driven pulley 35c.

In this case, the distal end of the locking lug 42b is at such a position that the clearance t1 is provided between the distal end of the locking lug 42b and the inner peripheral surface of the cylindrical portion 37 of the rib 35c5, which closes the radially-outside opening of the cutout section 43 (see FIG. 4). Thus, the locking lug 42b does not come into contact with the cylindrical portion 37 and therefore does not press the cylindrical portion 37 and the driven pulley 35c. Thus, the second external teeth 35c1 are not deformed. Further, the locking lug 42b itself is not deformed. Even when the locking lug 42b presses the bottom surface F1 of the pulley body 35c4 that faces the cutout section 43, the bottom surface F1 is at a position that is offset, in the axial direction, from the range of the second external teeth 35c1 in the axial direction. Thus, there is a low possibility that the second external teeth 35c1 will be deformed.

First Modified Example

In the foregoing embodiment, each cutout section 43 having the prescribed width T1 in the circumferential direction is provided so as to pass through the end portion of the pulley body 35c4 in the radial direction, at the first end side of the pulley body 35c4 (the driven pulley 35c). However, the configuration of each cutout section 43 is not limited to this. In a first modified example of the first embodiment illustrated in FIG. 7, each cutout section 43 need not pass through the end portion of the pulley body 35c4 in the radial direction, at the first end side of the pulley body 35c4.

Figure 7:
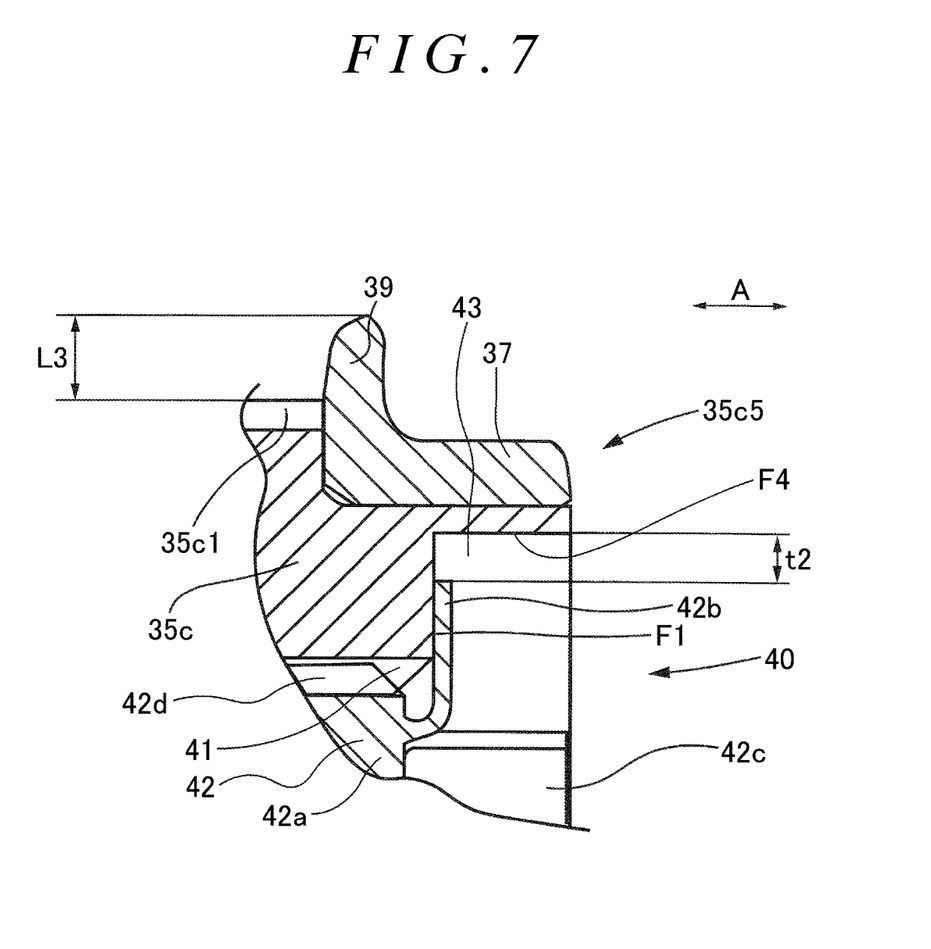
FIG. 7 is a view illustrating a fixing mechanism according to a first modified example.

That is, each cutout section 43 may be a space that is open at two sides, that is, the radially inner side and the axially end side of the pulley body 35c4, in the pulley body 35c4 (the driven pulley 35c). Thus, the cutout section 43 contacts the bottom surface F1 and the side surfaces F2, F3 of the pulley body 35c4, and an inner peripheral surface F4 that defines the cutout section 43 (that is, an inner peripheral surface of the driven pulley 35c). The bottom surface F1, the side surfaces F2, F3, and the inner peripheral surface F4 surround the cutout section 43, and the side surfaces F2, F3 face each other.

In this case, the radially-outside distal end of the locking lug 42b disposed in the cutout section 43 is at such a position that a clearance t2 is provided between the radially-outside distal end of the locking lug 42b and the inner peripheral surface of the driven pulley 35c (that is, the inner peripheral surface F4 that defines the cutout section 43). Thus, during formation of the locking lug 42b, the distal end of the locking lug 42b does not come into contact with the cylindrical portion 37 of the rib 35c5 and does not press the cylindrical portion 37 and the driven pulley 35c. Thus, the second external teeth 35c1 are not deformed. Further, the locking lug 42b itself is not deformed.

Second Modified Example

In the foregoing embodiment, the ribs 35c5 having an annular shape and prepared separately from the driven pulley 35c are provided at respective ends of the driven pulley 35c in the axial direction. However, the configuration and arrangement of the rib 35c5 is not limited to this. In a second modified example (not illustrated) of the first embodiment, one of the ribs 35c5 provided at the respective end portions of the driven pulley 35c in the axial direction may be provided so as to be integral with the driven pulley 35c instead of being formed separately from the driven pulley 35c. The second modified example produces the same advantageous effects as those in the foregoing embodiment.

Third Modified Example

Figure 8:
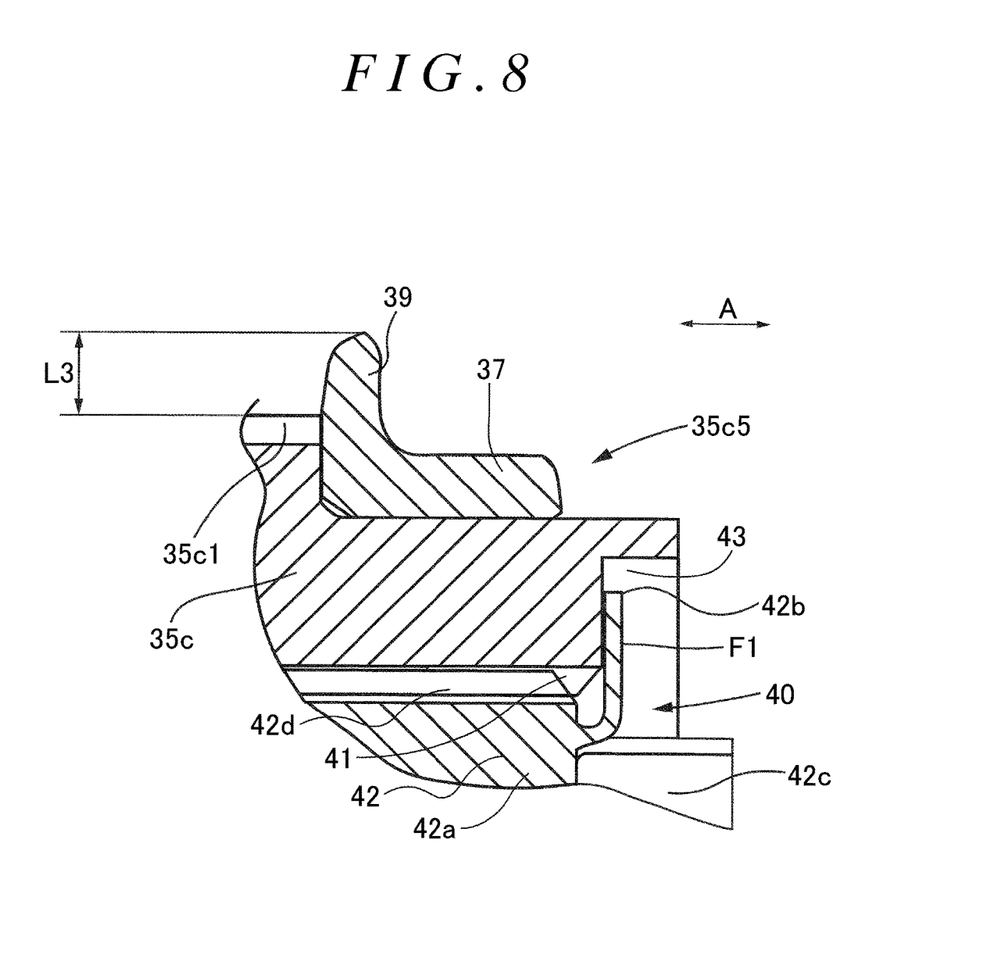
FIG. 8 is a view illustrating a fixing mechanism according to a third modified example.

In addition, the invention is not limited to the foregoing embodiment and the foregoing modified examples. In a third modified example of the first embodiment illustrated in FIG. 8, each cutout section 43 may be provided outside the range of the second external teeth 35c1 and the range of the rib 35c5 in the A-axis direction. Although the axial length of the driven pulley 35c is increased, this configuration produces a great effect on prevention of deformation of the second external teeth 35c1. In this case, the shape of the cutout section 43 is not limited to that illustrated in FIG. 8, and the cutout section 43 may pass through the driven pulley 35c outward in the radial direction.

Next, a second embodiment will be described with reference to FIG. 9. A steering apparatus S100 (see FIG. 1) according to the second embodiment differs from the steering apparatus S1 according to the first embodiment in that the steering apparatus S1 has a cutout section 143 formed in the axial direction. Thus, only the configurations different from those in the first embodiment will be described and the same configurations as those in the first embodiment will not be described. In addition, the same components as those in the first embodiment will be denoted by the same reference numerals as those in the first embodiment, in the following description.

Figure 9:
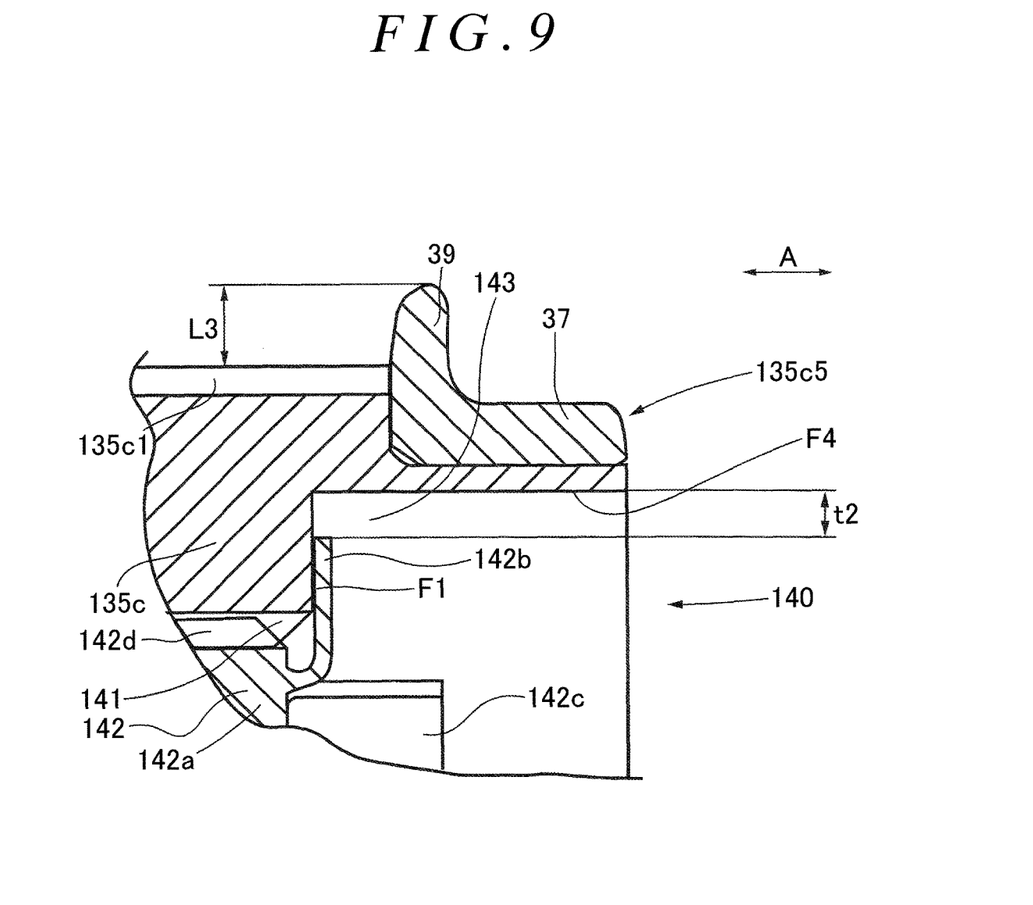
FIG. 9 is a view illustrating a fixing mechanism according to a second embodiment.

In the steering apparatus S100 according to the second embodiment, as illustrated in FIG. 9, in a driven pulley 135c, the cutout section 143 of a fixing mechanism 140 is provided at a position closer to the first end side (the right side in FIG. 9) of the driven pulley 135c than an internal thread 141, and the cutout section 143 is open at the radially inner side of the driven pulley 35c and the axially end side of the driven pulley 35c in the A-axis direction. In addition, the cutout section 143 is provided radially inward of the second external teeth 135c1 and the rib 135c5, within a range of the second external teeth 135c1 and a range of the rib 135c5 in the A-axis direction.

Thus, even when a locknut 142 has a remaining portion 142c extending in the axial direction, the driven pulley 135c can be provided without an increase in size in the axial direction. For this reason, the steering apparatus S100 which is not increased in size in the axial direction is provided. Note that, a method of assembling the fixing mechanism 140 is the same as the method of assembling the fixing mechanism 40 described in the first embodiment.

Advantageous Effects of Embodiments

As is apparent from the foregoing description, according to the first embodiment and the modified examples, the steering apparatus S1 includes: the rack shaft 21 (an example of "steered shaft") supported by the housing 22 so as to be slidable in the axial direction and configured to make a reciprocating motion in the axial direction to steer the steered wheels 26; the ball screw mechanism 33 including the ball screw portion 21b (an example of "rolling screw portion") having the first screw groove 21b1 provided on the outer peripheral surface of the rack shaft 21, the rolling nut 33a having the second screw groove 33a1 corresponding to the first screw groove 21b1 and provided on the inner peripheral surface thereof, and the balls 38 (an example of "rolling elements") accommodated between the first screw groove 21b1 and the second screw groove 33a1; the motor M fixed to the housing 22 and provided with the output shaft 32 that is offset from the rack shaft 21; the belt transmission mechanism 35 including the drive pulley 35a fixed to the output shaft 32 so as to be rotatable together with the output shaft 32 in an integrated manner and having the first external teeth 35a1 provided on the outer periphery thereof, the driven pulley 35c provided outside the rolling nut 33a and having the second external teeth 35c1 provided on the outer periphery thereof, and the toothed belt 35b having the internal teeth 35b1 meshed with the first external teeth 35a1 and the second external teeth 35c1 and configured to transmit a driving force between the drive pulley 35a and the driven pulley 35c; and the fixing mechanism 40 configured to restrict relative rotation between the rolling nut 33a and the driven pulley 35c.

The fixing mechanism 40 includes: the internal thread 41 provided on the inner peripheral surface of the driven pulley 35c; the cutout section 43 provided in the driven pulley 35c, at a position closer to the first end side of the driven pulley 35c than the internal thread 41, and configured to be open at least at the radially inner side of the driven pulley 35c and the axially end side of the driven pulley 35c in the axial direction; and the locknut 42 including the locknut body 42a having the external thread 42d screwed into the internal thread 41, and the locking lug 42b disposed in the cutout section 43 and engaged with the driven pulley 35c in the circumferential direction.

The cutout section 43 is provided at a position offset in the axial direction from the range of the second external teeth 35c1 in the axial direction. The locknut 42 includes the locknut body 42a, the locking lug 42b, and the remaining portion 42c. The locking lug 42b is a portion of the thin-wall cylindrical portion Tb extending from the locknut body 42a in the axial direction and thinner than the locknut body 42a. The locking lug 42b is formed to extend outward in the radial direction, and engaged with the cutout section 43 in the circumferential direction. The remaining portion 42c is a portion of the thin-wall cylindrical portion Tb other than the locking lug 42b.

In this way, the cutout section 43 of the driven pulley 35c is provided at a position offset in the axial direction from the range of the second external teeth 35c1 in the axial direction. For this reason, in a state where the locking lug 42b of the thin-wall cylindrical portion Tb of the locknut 42 is bent and engaged with the cutout section 43 of the driven pulley 35c, even when the locking lug 42b and prescribed portions of the side surfaces F2, F3 of the driven pulley 35c, which define the cutout section 43, come into contact with each other and are pressed each other in the circumferential direction to restrict the relative rotation, the second external teeth 35c1 do not easily receive a direct pressing force that would cause deformation of the second external teeth 35c1. Thus, the rolling nut 33a of the ball screw mechanism 33 and the driven pulley 35c configured to transmit the rotation of the motor M can be reliably fixed to each other without deformation.

As described above, at this time, the distal end of the locking lug 42b is at such a position that the clearance t1 or t2 is provided between the distal end of the locking lug 42b and the inner peripheral surface of the cylindrical portion 37 of the rib 35c5, which closes the radially-outside opening of the cutout section 43. Thus, during the assembly in which the locking lug 42b is formed, the locking lug 42b does not come into contact with the cylindrical portion 37 and therefore does not press the cylindrical portion 37 and the driven pulley 35c. Thus, the second external teeth 35c1 are not deformed. Even when the locking lug 42b presses the bottom surface F1 of the pulley body 35c4 that faces the cutout section 43 during the assembly, the bottom surface F1 is at a position that is offset, in the axial direction, from the range of the second external teeth 35c1 in the axial direction. Thus, there is a low possibility that the second external teeth 35c1 will be deformed.

According to the first embodiment, the first modified example, and the second modified example, the driven pulley 35c includes the second external teeth 35c1, and the rib 35c5 provided closer to the first end side of the driven pulley 35c than the second external teeth 35c1 and configured to restrict movement of the toothed belt 35b in the axial direction. The cutout section 43 is provided radially inward of the rib 35c5, within the range of the rib 35c5 in the axial direction. Thus, the same advantageous effects as those in the foregoing embodiment can be produced while an increase in size of the driven pulley 35c in the axial direction is suppressed.

According to the first embodiment, the first modified example, and the second modified example, the radially-outside distal end of the locking lug 42b is at such a position that the clearance t2 is provided between the radially-outside distal end of the locking lug 42b and the inner peripheral surface of the driven pulley 35c. Thus, the same advantageous effects as those in the foregoing embodiment can be produced.

According to the first embodiment, in the steering apparatus S1, the driven pulley 35c includes the pulley body 35c4 having the second external teeth 35c1 and the cutout section 43 provided closer to the first end side of the driven pulley 35c than the second external teeth 35c1 and formed to pass through the pulley body 35c4 in the radial direction, and the rib 35c5 having an annular shape, prepared separately from the pulley body 35c4, and attached to the pulley body 35c4 to close the radially-outside opening of the cutout section 43. The radially-outside distal end of the locking lug 42b is at such a position that the clearance t1 is provided between the radially-outside distal end of the locking lug 42b and the inner peripheral surface of the rib 35c5. In this way, the cutout section 43 is provided so as to pass through the pulley body 35c4 in the radial direction. Thus, the cutout section 43 can be easily formed at low cost.

According to the second embodiment, the steering apparatus S100 includes: the rack shaft 21 (an example of "steered shaft") supported by the housing 22 so as to be slidable in the axial direction and configured to make a reciprocating motion in the axial direction to steer the steered wheels 26; the ball screw mechanism 33 including the ball screw portion 21b (an example of "rolling screw portion") having the first screw groove 21b1 provided on the outer peripheral surface of the rack shaft 21, the rolling nut 33a having the second screw groove 33a1 corresponding to the first screw groove 21b1 and provided on the inner peripheral surface thereof, and the balls 38 (an example of "rolling elements") accommodated between the first screw groove 21b1 and the second screw groove 33a1; the motor M fixed to the housing 22 and provided with the output shaft 32 that is offset from the rack shaft 21; the belt transmission mechanism 35 including the drive pulley 35a fixed to the output shaft 32 so as to be rotatable together with the output shaft 32 in an integrated manner and having the first external teeth 35a1 provided on the outer periphery thereof, the driven pulley 135c provided outside the rolling nut 33a and having the second external teeth 135c1 provided on the outer periphery thereof, and the toothed belt 35b having the internal teeth 35b1 meshed with the first external teeth 35a1 and the second external teeth 135c1 and configured to transmit a driving force between the drive pulley 35a and the driven pulley 135c; and the fixing mechanism 140 configured to restrict relative rotation between the rolling nut 33a and the driven pulley 135c.

The driven pulley 135c includes the second external teeth 135c1, and the rib 35c5 provided closer to the first end side of the driven pulley 135c than the second external teeth 135c1 and configured to restrict movement of the toothed belt 35b in the axial direction. The fixing mechanism 140 includes: the internal thread 141 provided on the inner peripheral surface of the driven pulley 135c; the cutout section 143 provided in the driven pulley 135c, at a position closer to the first end side of the driven pulley 135c than the internal thread 141 and configured to be open at the radially inner side of the driven pulley 135c and the axially end side of the driven pulley 135c in the axial direction; and the locknut 142 including a locknut body 142a having an external thread 142d screwed into the internal thread 141 and a locking lug 142b disposed in the cutout section 143 and engaged with the driven pulley 135c in the circumferential direction.

The cutout section 143 is provided radially inward of the second external teeth 135c1 and the rib 35c5, within the range of the second external teeth 135c1 and the range of the rib 35c5 in the axial direction. The locknut 142 includes the locknut body 142a, the locking lug 142b, and the remaining portion 142c. The locking lug 142b is a portion of the thin-wall cylindrical portion Tb extending from the locknut body 142a in the axial direction and thinner than the locknut body 142a. The locking lug 142b is formed to extend outward in the radial direction, and disposed in the cutout section 143. The remaining portion 142c is a portion of the thin-wall cylindrical portion Tb other than the locking lug 142b.

In this way, the cutout section 143 of the driven pulley 135c is provided radially inward of the second external teeth 135c1 and the rib 35c5, within the range of the second external teeth 135c1 and the rib 35c5 in the axial direction. For this reason, even if a new fixing mechanism is provided and a locknut is used, the steering apparatus S100 is not increased in size in the axial direction, and can be provided as a compact steering apparatus.

The invention claimed is:

1. A steering apparatus comprising:
    a steered shaft supported by a housing so as to be slidable in an axial direction and configured to make a reciprocating motion in the axial direction to steer steered wheels;
    a ball screw mechanism including a rolling screw portion having a first screw groove provided on an outer peripheral surface of the steered shaft, a rolling nut having a second screw groove corresponding to the first screw groove and provided on an inner peripheral surface of the rolling nut, and a plurality of rolling elements accommodated between the first screw groove and the second screw groove;

a motor fixed to the housing and provided with an output shaft that is offset from the steered shaft;

a belt transmission mechanism including a drive pulley fixed to the output shaft so as to be rotatable together with the output shaft in an integrated manner and having first external teeth provided on an outer periphery of the drive pulley, a driven pulley provided outside the rolling nut and having second external teeth provided on an outer periphery of the driven pulley, and a toothed belt having internal teeth meshed with the first external teeth and the second external teeth and configured to transmit a driving force between the drive pulley and the driven pulley; and a fixing mechanism configured to restrict relative rotation between the rolling nut and the driven pulley, wherein the fixing mechanism includes an internal thread provided on an inner peripheral surface of the driven pulley, a cutout section provided in the driven pulley, at a position closer to a first end side of the driven pulley than the internal thread, and configured to be open at least at a radially inner side of the driven pulley and an axially end side of the driven pulley in the axial direction, and a locknut including a locknut body having an external thread screwed into the internal thread, and a locking lug disposed in the cutout section and engaged with the driven pulley in a circumferential direction, wherein the cutout section is provided at a position offset in the axial direction from a range of the second external teeth in the axial direction, and wherein the locknut includes the locknut body, the locking lug that is a portion of a thin-wall cylindrical portion extending from the locknut body in the axial direction and thinner than the locknut body, the locking lug being formed to extend outward in a radial direction, and engaged with the cutout section in the circumferential direction, and a remaining portion that is a portion of the thin-wall cylindrical portion other than the locking lug.

2. The steering apparatus according to claim 1, wherein the driven pulley includes the second external teeth, and a rib provided closer to the first end side of the driven pulley than the second external teeth and configured to restrict movement of the toothed belt in the axial direction, and the cutout section is provided radially inward of the rib, within a range of the rib in the axial direction.

3. The steering apparatus according to claim 1, wherein a radially-outside distal end of the locking lug is at such a position that a clearance is provided between the radially-outside distal end of the locking lug and the inner peripheral surface of the driven pulley.

4. The steering apparatus according to claim 2, wherein the driven pulley includes:

a pulley body having the second external teeth and the cutout section provided closer to the first end side of the driven pulley than the second external teeth and formed to pass through the pulley body in the radial direction; and the rib having an annular shape, prepared separately from the pulley body, and attached to the pulley body to close a radially-outside opening of the cutout section, and wherein a radially-outside distal end of the locking lug is at such a position that a clearance is provided between the radially-outside distal end of the locking lug and an inner peripheral surface of the rib.

5. A steering apparatus comprising:

a steered shaft supported by a housing so as to be slidable in an axial direction and configured to make a reciprocating motion in the axial direction to steer steered wheels;

a ball screw mechanism including a rolling screw portion having a first screw groove provided on an outer peripheral surface of the steered shaft, a rolling nut having a second screw groove corresponding to the first screw groove and provided on an inner peripheral surface of the rolling nut, and a plurality of rolling elements accommodated between the first screw groove and the second screw groove;

a motor fixed to the housing and provided with an output shaft that is offset from the steered shaft;

a belt transmission mechanism including a drive pulley fixed to the output shaft so as to be rotatable together with the output shaft in an integrated manner and having first external teeth provided on an outer periphery of the drive pulley, a driven pulley provided outside the rolling nut and having second external teeth provided on an outer periphery of the driven pulley, and a toothed belt having internal teeth meshed with the first external teeth and the second external teeth and configured to transmit a driving force between the drive pulley and the driven pulley; and a fixing mechanism configured to restrict relative rotation between the rolling nut and the driven pulley, wherein the driven pulley includes the second external teeth, and a rib provided closer to a first end side of the driven pulley than the second external teeth and configured to restrict movement of the toothed belt in the axial direction, wherein the fixing mechanism includes an internal thread provided on an inner peripheral surface of the driven pulley, a cutout section provided in the driven pulley, at a position closer to the first end side of the driven pulley than the internal thread, and configured to be open at a radially inner side of the driven pulley and an axially end side of the driven pulley in the axial direction, and a locknut including a locknut body having an external thread screwed into the internal thread, and a locking lug disposed in the cutout section and engaged with the driven pulley in a circumferential direction, wherein the cutout section is provided radially inward of the rib, within a range of the rib in the axial direction, or the cutout section is provided radially inward of the second external teeth and the rib, within a range of the second external teeth in the axial direction and the range of the rib in the axial direction, and wherein the locknut includes the locknut body;

the locking lug that is a portion of a thin-wall cylindrical portion extending from the locknut body in the axial direction and thinner than the locknut body, the locking lug being formed to extend outward in a radial direction, and disposed in the cutout section, and a remaining portion that is a portion of the thin-wall cylindrical portion other than the locking lug.

* * * * *